BINARY TO TERNARY CODE CONVERSION RECORDING SYSTEM

Filed Dec. 27, 1963 2 Sheets-Sheet 1

INVENTORS
DAVID T. BROWN
FREDERICK F. SELLERS, JR.

BY George C. Kutomy
AGENT

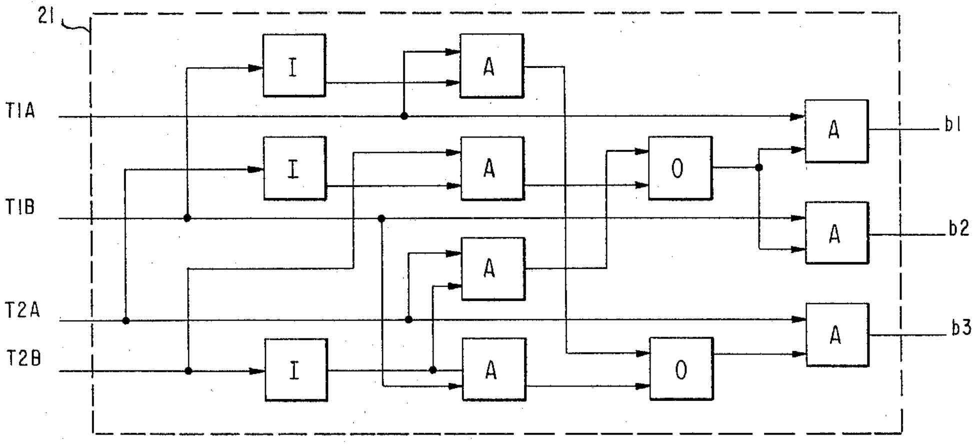
FIG.2C
FIG.3
| b1 | b2 | b3 | T1 A | T1 B | T2 A | T2 B | TERNARY T1 | CODE T2 |
|---|---|---|---|---|---|---|---|---|
| (BINARY) | | | | | | | | |
| 0 | 0 | 0 | 0 | 1 | 1 | 1 | 0 | 2 |
| 0 | 0 | 1 | 1 | 0 | 1 | 1 | 1 | 2 |
| 0 | 1 | 0 | 0 | 1 | 0 | 1 | 0 | 0 |
| 0 | 1 | 1 | 0 | 1 | 1 | 0 | 0 | 1 |
| 1 | 0 | 0 | 1 | 0 | 0 | 1 | 1 | 0 |
| 1 | 0 | 1 | 1 | 0 | 1 | 0 | 1 | 1 |
| 1 | 1 | 0 | 1 | 1 | 0 | 1 | 2 | 0 |
| 1 | 1 | 1 | 1 | 1 | 1 | 0 | 2 | 1 |
FIG.4A
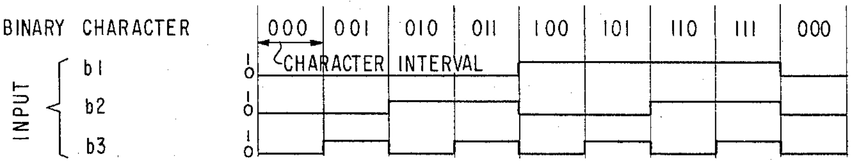
FIG.4B
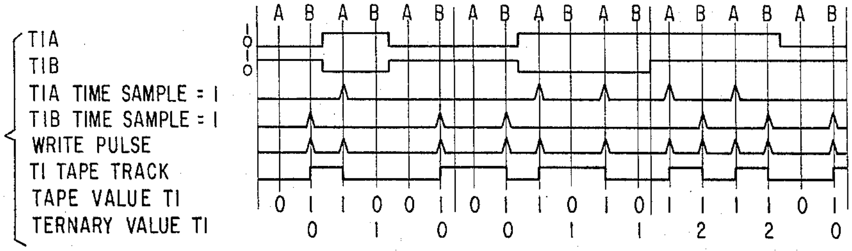
FIG.4C
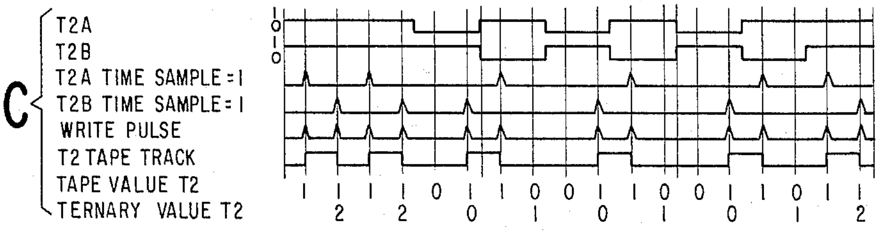

3,274,611

BINARY TO TERNARY CODE CONVERSION RECORDING SYSTEM

David T. Brown, Wappingers Falls, and Frederick F. Sellers, Jr., Hopewell Junction, N.Y., assignors to International Business Machines Corporation, New York, N.Y., a corporation of New York Filed Dec. 27, 1963, Ser. No. 333,820
5 Claims. (Cl. 346—74)

This invention relates to magnetic recording systems; more particularly, the invention relates to a magnetic recording system in which information is written onto a storage medium in a ternary representation.

Those skilled in the art will recognize that the various techniques used for recording on magnetic surfaces can be categorized into a number of generic classifications. Most existing recording techniques will fall into one of these classifications.

Briefly, from a chronological standpoint, one of the earliest recording techniques was the so-called return-to-zero (RZ) recording technique in which binary digits were recorded on a magnetic medium by representing each binary digit in terms of flux excursion to extreme opposite levels about a zero reference level to which the flux in the magnetic storage medium returns before the next binary digit is written. One of the most noteworthy characteristics of RZ recording techniques is that it involves two flux transitions for each binary digit that is recorded.

Efforts to increase the packing density of data recorded in the magnetic storage medium led to the development of the so-called non-return-to-zero (NRZ) recording method in which flux transitions are impressed on the magnetic storage medium only when successive digits are unlike. Clearly, in such a system, the number of flux transitions to represent the same amount of data is half of that amount required for recording the same amount of data by RZ techniques. In other words, for the same number of flux transitions per inch of storage medium, NRZ techniques represent twice the amount of digits (that is, more information) than the corresponding RZ techniques.

Those recording systems, commonly classified as NRZI also belong to NRZ categorization but differ therefrom in that only one of the binary digits, for example the binary "ONE" is recorded as a flux transition. Again, as in the NRZ recording techniques, NRZI recording techniques have twice the packing density of the RZ recording techniques. For the name number of flux transitions per inch of magnetic storage medium, NRZI recording techniques are capable of recording data at twice the packing density of an RZ system.

As those skilled in the art will recognize, the gains in packing density achieved by the NRZ and the NRZI recording techniques have not been without their price. While it is true that NRZ(I) systems are capable of higher packing density than corresponding RZ systems, their most characteristic deficiency arises from the presence of substantial amounts of low-frequency signal components in the recorded flux waveform which complicate the design of the amplifiers and the head circuitry. For example, under the NRZ(I) recording techniques, if a sequence of like digits is contained in a message, no flux transitions are recorded in the magnetic storage medium, and there is a substantial (D.-C.) component present in the recorded signal. Even further, a continually unchanging flux level, such as is apt to arise in NRZ(I) techniques, prevents the positive identification of data digits (since, basically, presence of a digit is determined by the absence of the other digit) and further eliminates the advantages accruing from the presence of flux transitions which may be utilized for synchronization purposes, as those skilled in the art will recognize.

The respective problems faced by the RZ and the NRZ(I) recording techniques have been neatly solved by a recording technique which is generally known as the phase recording type. Those skilled in the art will recognize that this is a recording technique which is characterized by flux transitions which occur in the center of the digit interval so that a binary "ONE" digit is represented by a flux transition from positive to negative, while a binary "ZERO" is represented by a flux transition from negative to positive. While phase recording techniques thus eliminate the occurrence of D.-C. components in the magnetic flux signal and also offer a sufficient number of flux transitions for each digit interval to serve as synchronization information, the packing density of phase recording techniques is not as high as desirable, certainly not as high as that of NRZ(I) techniques. To date, therefore, when faced with the need for high data densities, i.e., higher than those that can be achieved with phase recording techniques, engineers have had to abandon the phase techniques and have been forced to resort to NRZ(I) techniques with their attendant difficulties in providing synchronization information and the undesirable presence of D.-C. and low frequency components in the recorded flux waveform.

Accordingly, it is a prime object of this invention to provide a new and improved magnetic recording system.

It is another object of this invention to provide a magnetic recording system which shares all the advantages of a phase recording technique and yet allows an increased data density over the phase recording technique.

It is yet another object of this invention to provide an improved magnetic recording system having no D.-C. signal components in the recorded flux waveform.

It is yet another object of this invention to provide an improved magnetic recording system having no substantial low-frequency signal components in the recorded flux waveform.

It is still another object of this invention to provide an improved magnetic recording system in which each information character is positively identified by at least one flux transition in the recorded flux waveform.

It is a feature of the magnetic recording system according to the invention that it achieves a 59 percent increase in data density over a magnetic recording system utilizing phase recording techniques.

According to the invention, binary digits to be recorded onto a magnetic storage medium are provided to a binary-to-ternary converter before they are to be written onto a magnetic storage medium. The binary-to-ternary converter converts these signals and produces a series of ternary digits, having one of three possible values, zero, one or two, in such a fashion that each ternary digit contains at least one binary "ONE" digit. Write means, responsive to the output of the converter, cause flux transitions in the storage medium each time a binary "ONE" is sensed for a ternary digit. Thereby, each ternary digit has at least one flux transition recorded in the magnetic storage medium.

The foregoing and other objects, features and advantages of the invention will be apparent from the following more particular description of an exemplary embodiment of the invention as illustrated in the accompanying drawings.

In the drawings:

FIG. 2C shows a portion of the ternary-to-binary converter employed in the read section of the system shown in FIG. 1.

FIG. 3 shows a table of values relating the various binary input conditions and the ternary output conditions in the binary-to-ternary converter of FIG. 2A.

FIG. 4A shows representative waveforms for various combinations of binary digits appearing on the input terminals of the converter of FIG. 2A.

Figure 1:
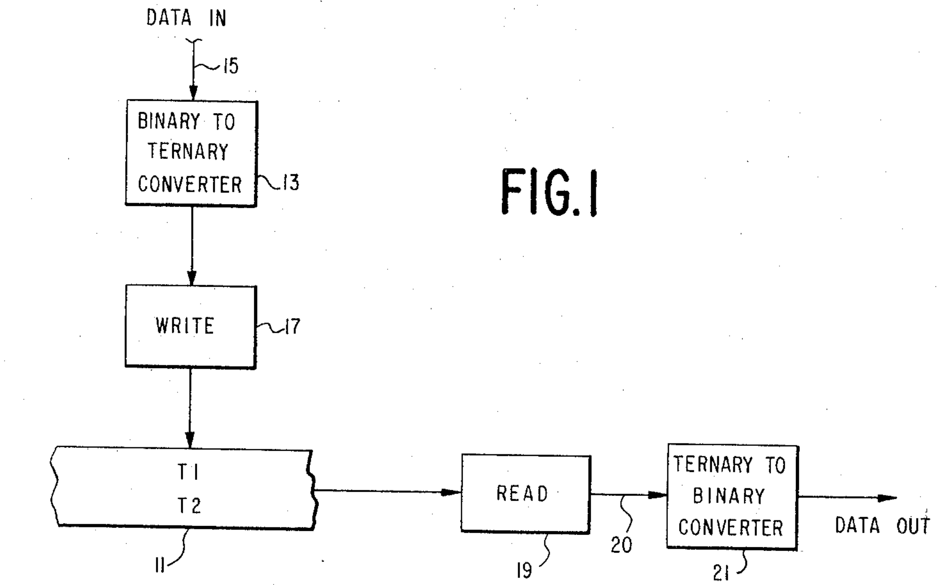
FIG. 1 shows a schematic system diagram of the invention.

FIGS. 4B–C show representative waveforms occurring in the write portion of the system shown in FIG. 1.

GENERAL STRUCTURE

Referring now to FIG. 1, there is shown a schematic system diagram of the invention. Binary data to be written onto a magnetic storage medium such as a magnetic tape 11, which for simplicity, has been illustrated as having only two tracks, T1 and T2, enters binary-to-ternary converter 13 via line 15. The binary-to-ternary converter 13 converts the binary input data into a ternary code, having a possible set of values, zero, one or two, in a fashion as will be described below.

The output from binary-to-ternary converter 13 is provided to write circuitry 17, which proceeds to write the ternary digits produced by converter 13 onto the magnetic tape 11, in a fashion to be described below.

For reading of the information so stored on the magnetic tape 11, read circuitry 19 detects the flux transitions recorded on the magnetic tape 11 and provides on its output terminal 20, signals which indicate the detection of each of the ternary digits zero, one or two. The output signals from read circuit 19, being in ternary form, are provided to a ternary-to-binary converter 21 which converts the ternary characters into a binary form suitable for use in the subsequent processing stages of computing apparatus.

Figure 2A:
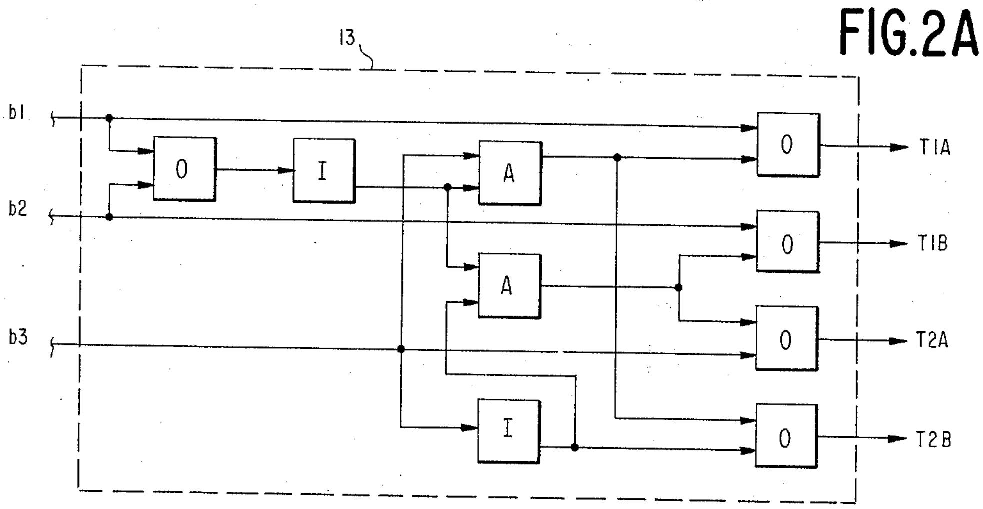
FIG. 2A shows a binary-to-ternary converter used in the system shown in FIG. 1.

Referring now to FIGS. 2A and 3 jointly, the binary-to-ternary converter 13 of FIG. 1 will be described in more detail. Three input lines, labeled *b*1, *b*1 and *b*3 are provided to the converter 13 and they carry signals which are converted to a ternary code on the outputs T1A, T1B, T2A and T2B, in accordance with the coding relationship shown in FIG. 3. It should be noted that the converter 13 is illustrated in a representative form which utilizes two tracks, T1 and T2, but that no limitation to this number of tracks in intended. A larger number of tracks would only involve additional duplication of converter circuitry identical to that shown in the dotted lines 13. As can be seen from FIG. 3, when lines *b*1, *b*2 and *b*3 each provide binary digits, the output lines T1A, T1B, T2A and T2B will produce signal conditions in accordance with the table there shown. It should be noted that the ternary code digits represented on the A and B terminals of any one track, for example, T1, are such that regardless of whether the ternary digit is a zero, a one, or a two, at least one of the A, or the B, lines of any one track will always produce a binary "ONE" digit.

Figure 2B:
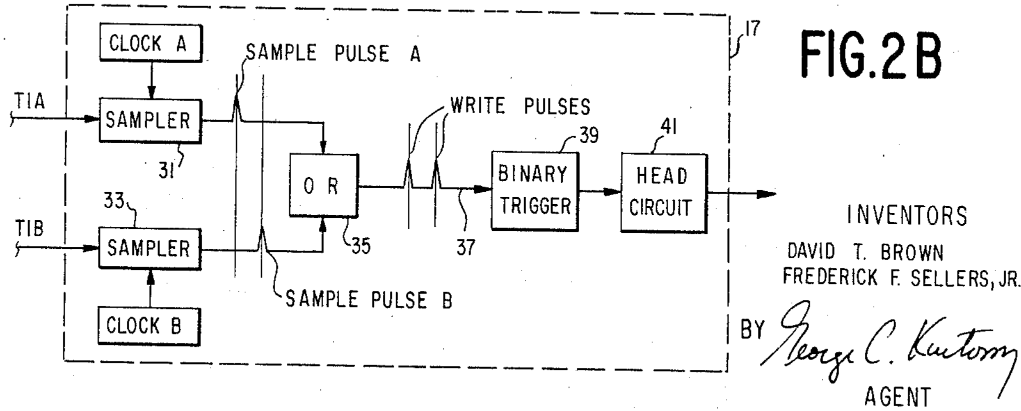
FIG. 2B shows a portion of the write circuitry utilized in the system shown in FIG. 1.

Continuing with a description of the structure, FIG. 2B shows the essential details of the write circuitry 17 of FIG. 1, for only one track, namely, T1. The circuitry for the other tracks T2, as well as any additional ones which may be added, is merely a duplication of that much shown in FIG. 2B for each additional track.

The T1A and the T1B lines from converter 13 (FIG. 2A) are provided to respective sampler circuits 31, 33 which are respectively controlled in turn, by suitable clocks, clock A controlling sampler 31 and clock B, controlling sampler 33. As will be described in more detail below, clocks A and B cause the samplers 31 and 33 to sample at nonidentical time periods within a time interval known as a character interval.

Samples 31 and 33 sample the signal conditions existing on the lines T1A and T1B and produce output signals only when the corresponding lines T1A or T1B carry a binary "ONE" signal. The sample pulses A and B, produced by respective samplers 31 and 33 indicating that a binary "ONE" signal has been sampled on lines T1A and T1B, are ORed together in OR circuit 35 which produces on the output line 37, write pulses each time that a sample pulse A or B is present. The write pulses produced on line 37 are applied to a binary trigger 39 which will switch state each time it is actuated by a write pulse. Binary trigger 39 in turn, controls a conventional head circuit 41 of a recording system to cause a flux reversal for each time that the binary trigger 39 switches state.

Since, as will be later described, the reading process from tape 10 must be responsive to flux transitions, and which is therefore in this respect similar to NRZ(I) reading techniques, the read circuitry 19 shown in FIG. 1 is of the well-known NRZ(I) type. For this reason, details of read circuitry 19 have not been shown, as it does not contribute to the gist of the invention. However, in order to properly recover the data which is written in a ternary form onto the tape 11 (FIG. 1), the details of a ternary-to-binary converter 21 are shown in FIG. 2C to indicate that the respective flux transitions sensed by read circuitry 19 are provided to the lines T1A, T1B, T2A and T2B of a representative converter 21 two track embodiment. In response to signals, the ternary-to-binary converter 21 shown in FIG. 2C will produce signals on its output terminals *b*1, *b*2 and *b*3, in accordance with the code shown in FIG. 3, so that every ternary digit is converted into a binary form. It is not considered necessary to describe converter 21 in more detail.

OPERATION

Referring now to FIGS. 4A–C, the operation of the invention will be described.

FIG. 4A shows a binary character comprising three binary digits, *b*1, *b*2 and *b*3, being applied as part of the input data, to the binary-ternary converter 13. The successively changing information embodied in the binary character over a number of time intervals known as character intervals, is represented by the waveform shown in FIG. 4A which changes within each character interval, to provide a different combination of signals on the lines *b*1, *b*2 and *b*3 to the converter B.

FIG. 4B placed below FIG. 4A shows the simultaneously occurring signal conditions on the T1A and the T1B output terminals of converter 13.

Again, the T1A and the T1B waveforms keep changing, between their respective "ONE" and "ZERO" levels in accordance with the code shown in FIG. 3, in response to the changing signal conditions on the lines *b*1, *b*2 and *b*3.

The sampler circuits 31 and 33, which sample at the respective times A and B, shown in FIG. 4B, produce on their output terminals the signal waveforms shown in FIG. 4B, and it is seen that the samplers 31 and 33 will produce output signals only when the corresponding signal on terminals T1A and T1B is at a binary "ONE" level. The succession of write pulses, generated by OR circuit 35 (FIG. 2B) occur once for each time that either of the samplers 31 and 33 produce sample pulses that are ORed together in OR circuit 35.

The resultant waveform recorded on the tap track T1 in response to the succession of write pulses from OR circuit 35 is shown in FIG. 4B and it sould be noted that each time a write pulse occurs, the flux signal in the tape track T1 undergoes a reversal in response to the changing of state of binary trigger 39 (FIG. 2B).

Immediately below the flux waveform shown in FIG. 4B, there are shown the logical values of magnetization of the tape, and their corresponding ternary values. It is noted, that each ternary character, whether it be a zero, a one, or a two, includes at least one flux reversal of the flux signal waveform on the tape track and it is this feature, i.e., the presence of at least one flux transition for each ternary digit, that insures the unique characteristics of this invention. That is, the assurance of at least one flux transition for each ternary digit recorded, eliminates the possibility of there ever arising and D.-C. components in the recorded flux waveform, even if an entire string of like digits is recorded. Further, the assurance of flux transitions for each digit recorded, allows valuable synchronization information to be derived from the signal developed upon reading such a flux waveform.

FIG. 4C shows another set of waveforms which illustrate the different signal conditions occurring on the T2A and T2B terminals of converter 13 in response to the binary signals applied thereto. The operation by which the waveforms shown in FIG. 4C are generated, is entirely analogous to that described with reference to FIG. 4B and again, the tape track T2 contains a flux waveform which includes at least one flux transition for each ternary digit. That is, in both the T1 and the T2 tape tracks, respectively shown in FIGS. 4B and 4C, at least one flux transition at either the A or B sampling times, occurs for each ternary character, even for a zero character. As shown in FIG. 4B for example, a ternary zero digit always has a flux transition that is, a change in the flux level on the tape track.

It is to be noted that while the invention has been described with reference to a preferred embodiment including a magnetic tape as the storage medium, no such limitation is intended. The recording system of the invention may also be used with magnetic drums, disks or the like.

It is evident that there has been described a magnetic recording system which shares the advantage of the phase recording techniques but yet achieves a higher data density. A comparative evaluation shows that the data density, expressable in bits per flux transition time, for the phase recording techniques, yields a factor of 0.5 bits/flux transition time. On the other hand, the magnetic recording system according to the invention achieves a data density of 0.79 bits/flux transition time, an increase of almost 60% over the phase recording techniques.

While the invention has been particularly shown and described with reference to a preferred embodiment thereof, it will be understood by those skilled in the art that various changes in form and details may be made therein without departing from the spirit and scope of the invention.

What is claimed is:

1. In a magnetic recording system, the combination comprising:

conversion means for converting binary signals to be written onto a magnetic storage medium into a ternary representation, said conversion means producing an output signal which is the combination of two binary digits for each ternary digit, each ternary digit including at least one binary digit that is a binary "ONE"; and write means connected to said conversion means for writing said ternary digits onto said storage medium, said write means including means for causing phase reversal of magnetic flux on said storage medium for each binary "ONE" digit included in a ternary digit, whereby ternary information is recorded onto said storage medium with at least one flux reversal for each ternary digit.

2. In a magnetic recording system, the combination comprising:

conversion means for converting binary signals to be written onto a magnetic storage medium into a ternary representation, said conversion means including two output terminals, a first terminal and a second terminal, for each ternary digit, with each ternary digit being designated by at least one of said output terminals producing a binary "ONE" signal;

write means connected to said conversion means, said write means including means for sampling each of said first and said second terminals once within the time period for which binary signals persist on said output terminals, said sampling means producing a write pulse for each binary "ONE" signal appearing on said output terminals; and means responsive to each write pulse produced by said sampling means for causing a flux reversal in said magnetic storage medium, whereby ternary information is written onto said magnetic storage medium with at least one flux reversal for each ternary digit.

3. The combination according to claim 2, wherein said write means further includes clocking means controlling said sampling means for sampling said first and said second output terminals at different times.

4. In a multiple track magnetic recording system, the combination comprising:

conversion means for converting binary signals to be written onto a magnetic storage medium into a ternary representation, said conversion means including, for each track, two output terminals, a first terminal and a second terminal for each ternary digit, with each ternary digit being designated by at least one of said output terminals producing a binary "ONE" signal;

write means connected to said conversion means, said write means including, for each track, means for sampling each of said first and said second terminals once within the time period for which binary signals persist on said output terminals, said sampling means producing a write pulse for each binary "ONE" signal appearing on said output terminals; and means responsive to each write pulse produced by said sampling means for causing a flux reversal in said magnetic storage medium, whereby ternary information is written onto said magnetic tape with at least one flux reversal for each ternary digit.

5. The combination according to claim 4, wherein said magnetic storage medium is a magnetic tape.

References Cited by the Applicant

UNITED STATES PATENTS 3,020,526 2/1962 Ridler et al.

BERNARD KONICK, *Primary Examiner.*

A. I. NEUSTADT, *Assistant Examiner.*